(12) United States Patent
Cha et al.

(10) Patent No.: US 11,203,271 B2
(45) Date of Patent: Dec. 21, 2021

(54) APPARATUS AND METHOD FOR DISPLAYING DISTANCE TO EMPTY OF VEHICLE

(71) Applicants: Hyundai Motor Company, Seoul (KR); Kia Motors Corporation, Seoul (KR)

(72) Inventors: Jung Min Cha, Hwaseong-si (KR); Deok Keun Shin, Seongnam-si (KR); Jae Seok You, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 334 days.

(21) Appl. No.: 16/428,136

(22) Filed: May 31, 2019

(65) Prior Publication Data
US 2020/0171972 A1 Jun. 4, 2020

(30) Foreign Application Priority Data
Nov. 29, 2018 (KR) .......................... 10-2018-0151077

(51) Int. Cl.
*B60L 50/10* (2019.01)
*B60L 58/10* (2019.01)
(Continued)

(52) U.S. Cl.
CPC .............. *B60L 58/10* (2019.02); *B60K 35/00* (2013.01); *B60L 50/50* (2019.02); *G07C 5/004* (2013.01); *G07C 5/0825* (2013.01); *B60L 2240/12* (2013.01); *B60L 2240/26* (2013.01); *B60L 2240/423* (2013.01); *B60L 2240/642* (2013.01)

(58) Field of Classification Search
CPC .... B60L 58/10; B60L 50/50; B60L 2240/423; B60L 2240/12; B60L 2240/26; B60L 2240/642; B60L 58/12; B60L 2260/52; B60L 2260/54; B60L 2250/16; G07C 5/004; G07C 5/0825; B60K 35/00; B60K 2370/169; Y02T 10/70; Y02T 10/64; Y02T 90/16; Y02T 10/72
See application file for complete search history.

(56) References Cited

U.S. PATENT DOCUMENTS

2015/0367856 A1* 12/2015 Meyer ...................... G07C 5/08
                                                                    701/123
2016/0023554 A1*  1/2016 Tseng ....................... B60K 6/48
                                                                    701/22
(Continued)

*Primary Examiner* — Kenneth J Malkowski
(74) *Attorney, Agent, or Firm* — Morgan, Lewis & Bockius LLP

(57) ABSTRACT

An apparatus for displaying a distance to empty of a vehicle includes a controller configured to: estimate a mass of the vehicle, which increases or decreases while the vehicle is running; to calculate a driving energy consumption using a past-learned energy consumption based on a mass level corresponding to the increase or decrease in mass of the vehicle while the vehicle is running, and a current energy consumption of the vehicle; to calculate the distance to empty of the vehicle based on the driving energy consumption; to determine whether to update the distance to empty displayed on a display based on the mass level while the vehicle is running; and to update display information on the display based on the distance to empty.

14 Claims, 8 Drawing Sheets

(51) Int. Cl.
*B60L 50/50* (2019.01)
*G07C 5/00* (2006.01)
*B60K 35/00* (2006.01)
*G07C 5/08* (2006.01)

(56) References Cited

U.S. PATENT DOCUMENTS

| | | | |
|---|---|---|---|
| 2016/0061610 A1* | 3/2016 | Meyer | G01C 21/26 |
| | | | 701/22 |
| 2016/0097652 A1* | 4/2016 | Liu | G01C 21/3469 |
| | | | 701/423 |
| 2016/0129803 A1* | 5/2016 | Grewal | B60L 50/16 |
| | | | 701/22 |
| 2016/0129918 A1* | 5/2016 | Skaff | B60L 50/16 |
| | | | 340/455 |
| 2018/0029500 A1* | 2/2018 | Katanoda | G01C 21/005 |

* cited by examiner

APPARATUS AND METHOD FOR DISPLAYING DISTANCE TO EMPTY OF VEHICLE

CROSS-REFERENCE TO RELATED APPLICATION

This application is based on and claims the benefit of priority to Korean Patent Application No. 10-2018-0151077, filed on Nov. 29, 2018, in the Korean Intellectual Property Office, the disclosure of which is incorporated herein in its entirety by reference.

TECHNICAL FIELD

The present disclosure relates to an apparatus and a method for displaying a distance to empty of a vehicle.

BACKGROUND

It is important to maintain a state of charge of a battery above a certain level for a vehicle that obtains drive power from a battery, such as an electric vehicle (EV). A conventional EV predicts a distance-to-empty (DTE) in consideration of a remaining state of charge of the battery and a running resistance of the vehicle and provides a driver with the predicted DTE.

In vehicles, such as freight transport vehicles, trucks and/or vehicles with detachable trailer, when a cargo is loaded into or unloaded from the vehicles, a weight of the vehicles is changed greatly. In this case, since the running resistance of the vehicles increases or decreases, the DTE is changed.

However, since the conventional EV does not consider the weight of the vehicle when predicting the DTE, it is difficult to accurately predict a variation in DTE. Accordingly, it is difficult for the driver to trust information on the DTE provided through a display, thereby reducing a driving convenience of the driver.

SUMMARY

The present disclosure has been made to solve the above-mentioned problems occurring in the prior art while advantages achieved by the prior art are maintained intact.

An aspect of the present disclosure provides an apparatus and a method for displaying a distance to empty of a vehicle, which are capable of accurately providing a distance to empty and improving reliability and convenience of a driver at the same time by estimating an increase or decrease in mass due to loading or unloading of a cargo while the vehicle is running and predicting the distance to empty in consideration of an energy consumption depending on the increase or decrease in mass.

The technical problems to be solved by the present disclosure are not limited to the aforementioned problems, and any other technical problems not mentioned herein will be clearly understood from the following description by those skilled in the art to which the present disclosure pertains.

According to an exemplary embodiment of the present disclosure, an apparatus for displaying a distance to empty of a vehicle includes a controller configured to: estimate a state of a mass of the vehicle, which increases or decreases while the vehicle is running; calculate a driving energy consumption using a past-learned energy consumption based on a mass level corresponding to the increased or decreased mass of the vehicle while the vehicle is running, and a current energy consumption of the vehicle; calculate the distance to empty of the vehicle based on the calculated driving energy consumption; determine whether to update the distance to empty displayed on a display based on the mass level while the vehicle is running; and update display information on the display based on the distance to empty.

The controller updates the distance to empty displayed on the display when the mass level corresponding to the increased or decreased mass is different from an initial mass level of the vehicle.

The controller estimates the state of the increased or decreased mass of the vehicle based on at least one of a reducer efficiency, a motor torque, a running load, a vehicle speed, or a road gradient of the running vehicle.

The controller extracts the past-learned energy consumption corresponding to the mass level of the vehicle among past-learned energy consumptions for previously-learned respective mass levels and calculates the driving energy consumption of the vehicle by applying the extracted past-learned energy consumption and the current energy consumption of the vehicle at a predetermined rate.

The controller determines the application rate of the past-learned energy consumption and the current energy consumption based on a state of charge (SOC) of a battery.

The controller determines the application rate of the current energy consumption to about 100% when a remaining SOC is smaller than a first reference value, determines the application rate of the current energy consumption to about 0% when the remaining SOC is equal to or greater than a second reference value, and gradually increases the application rate of the current energy consumption depending on a rate at which the remaining SOC decreases when the remaining SOC is equal to or greater than the first reference value and smaller than the second reference value.

The controller calculates an additional-use energy consumption based on a travel distance of the vehicle and an air conditioner-use power of the vehicle when an air conditioning system in the vehicle operates in an ON state.

The controller calculates a charge/discharge energy consumption gain depending on a gradient of a road ahead and adds the charge/discharge energy consumption gain to the additional-use energy consumption.

The controller calculates the distance to empty of the vehicle based on the driving energy consumption and the additional-use energy consumption of the vehicle.

The controller informs a state of change in the distance to empty due to the increased or decreased mass through the display during a predetermined time before updating the display information on the display when the distance to empty displayed on the display is determined to be updated.

According to another exemplary embodiment of the present disclosure, a method for displaying a distance to empty of a vehicle includes steps of: estimating a state of a mass of the vehicle, which increases or decreases while the vehicle is running; determining whether to update the distance to empty displayed on a display based on a mass level corresponding to the increased or decreased mass of the vehicle while the vehicle is running; calculating a driving energy consumption using a past-learned energy consumption based on the mass level while the vehicle is running, and a current energy consumption of the vehicle; calculating the distance to empty of the vehicle based on the driving energy consumption; and updating display information on the display based on the distance to empty.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
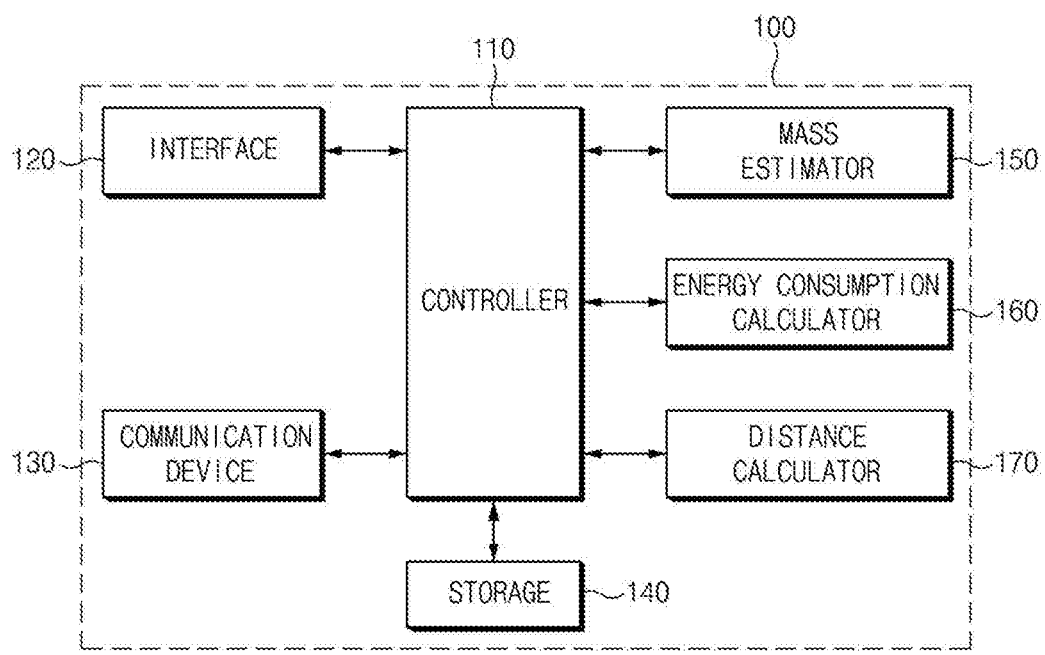
FIG. 1 is a view illustrating a configuration of an apparatus for displaying a distance to empty of a vehicle according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to an apparatus and a method for displaying a distance to empty of a vehicle, and the present disclosure may be applied to vehicles, such as trucks, freight transport vehicles, and/or vehicles with detachable trailer, of which distance to empty is affected by an increase in weight of the vehicles due to loading or unloading a cargo while the vehicles are running.

FIG. 1 is a view illustrating a configuration of an apparatus for displaying a distance to empty of a vehicle according to an exemplary embodiment of the present disclosure.

The apparatus 100 for displaying the distance to empty of the vehicle may be implemented inside the vehicle. The apparatus 100 for displaying the distance to empty of the vehicle may be integrally formed with internal control devices of the vehicle or may be connected to the internal control devices of the vehicle by a separate connectors after being implemented as a separate device.

Referring to FIG. 1, the apparatus 100 for displaying the distance to empty of the vehicle may include a controller 110, an interface 120, a communication device 130, a storage 140, a mass estimator 150, an energy consumption calculator 160, and a distance calculator 170. In the present exemplary embodiment, the controller 110, the mass estimator 150, the energy consumption calculator 160, and the distance calculator 170 of the apparatus 100 for displaying the distance to empty of the vehicle according to the present embodiment may be implemented as at least one processor. In the present disclosure, each of the controller 110, the mass estimator 150, the energy consumption calculator 160, and the distance calculator 170 may be an electronic control unit (ECU), or the controller 110 may have the mass estimator 150, the energy consumption calculator 160, and the distance calculator 170 embedded therein.

The controller 110 may process signals transmitted to each component of the apparatus 100 for displaying the distance to empty of the vehicle.

The interface 120 may include an input device to receive a control instruction from a user and an output device to output an operation state and operation results of the apparatus 100 for displaying the distance to empty of the vehicle.

Here, the input device may include a key button, a mouse, a joystick, a jog shuttle, a stylus pen, and the like. In addition, the input device may include a soft key implemented on a display.

The output device may include the display. As an example, the display may display information on a distance to empty of the vehicle. In addition, the output device may include a voice output device, such as a speaker. In a case that a touch sensor, e.g., a touch film, a touch sheet, a touch pad, etc., is included in the display, the display may operate as a touch screen, and the display may be implemented in an integrated form of the input device and the output device.

The display may include at least one of a liquid crystal display (LCD), a thin film transistor-liquid crystal display (TFT-LCD), an organic light-emitting diode (OLED), a flexible display, a field emission display (FED), or a three-dimensional (3D) display.

The communication device 130 may include a communication module that supports a communication interface with electrical equipment and/or controllers included in the vehicle. For example, the communication module may receive state information about the vehicle from sensors and/or systems included in the vehicle. The state information about the vehicle may include a starting state of the vehicle, a charge state of the vehicle, a battery and/or load information of the vehicle, and vehicle speed information.

The communication module may include a module supporting a vehicle network communication, such as a controller area network (CAN) communication, a local interconnect network (LIN) communication, and a Flex-ray communication.

In addition, the communication module may further include a module for a wireless internet access and/or a module for a short range communication.

The storage 140 may store data and/or algorithms required to operate the apparatus 100 for displaying the distance to empty of the vehicle.

As an example, the storage 140 may store the information on the state of the vehicle, which are provided through the communication device 130. The storage 140 may store conditions, instructions, and/or algorithms to allow the apparatus 100 for displaying the distance to empty of the vehicle to perform operations of estimating an increase or decrease in mass of the vehicle, calculating a driving energy consumption, and calculating the distance to empty. The storage 140 may store energy consumption information learned in the past.

In the present embodiment, the storage 140 may include a storage medium, such as a random access memory (RAM), a static random access memory (SRAM), a read-only memory (ROM), a programmable read-only memory (PROM), or an electrically erasable programmable read-only memory (EEPROM).

The mass estimator 150 may estimate the increase or decrease in mass of the vehicle while vehicle is running. The mass estimator 150 may estimate the increase or decrease in mass of the vehicle by comparing a driving force of the vehicle, a running load of the vehicle, and a variation in the momentum of the vehicle.

As an example, the mass estimator 150 may estimate the mass (weight) of the vehicle using the following Equation 1.

$$m = \frac{\int_{t0}^{t1}\left[\frac{\eta_{RD}}{r_{tire}}(\tau_{Mot}^{BeAj}) - (f_0 + f_1 v + f_2 v^2)\right]dt}{\left[v + \int_{t0}^{t1} g\sin\theta \, dt\right]}$$

Equation 1

In Equation 1, "m" denotes an estimated mass, "η" denotes a reducer efficiency, "r" denotes a tire radius, "τ" denotes a motor torque, "f" denotes a running load, "v" denotes a vehicle speed, "g" denotes a gravity, and "θ" denotes a road gradient.

In addition, the mass estimator 150 may determine a final estimated mass after verifying the estimated mass. In the present embodiment, the mass estimator 150 may verify the estimated mass by comparing a variation of minimum value/maximum value of the estimated mass, a variation of the vehicle speed, and a gradient impulse rate and may determine the final estimated mass. Accordingly, the mass estimator 150 may estimate the increase or decrease in mass from an initial mass of the vehicle.

The controller 110 may identify a mass level corresponding to a degree of the increase or decrease in mass estimated by the mass estimator 150.

In the present embodiment, the mass level may be defined in advance in the unit of fixed mass. As an example, the mass level may be defined as follows. A mass range from about 0 kg to about 249 kg is assigned with Level 0, a mass range from about 250 kg to about 499 kg is assigned with Level 1, a mass range from about 500 kg to about 749 kg is assigned with Level 2, a mass range from about 750 kg to about 999 kg is assigned with Level 3, and a mass range equal to or greater than about 1000 kg is assigned with Level 4.

The controller 110 may determine whether the mass level is changed when compared with a mass level of the vehicle before the vehicle starts to drive. When it is determined that the mass level of the vehicle is changed, the controller 110 may determine an update of the information on the distance to empty displayed on the display.

As an example, when assuming that a distance to empty of a truck, which has a curb weight of about 2000 kg, a seating capacity of two persons, and a 60 kwh battery with an SOC of 100%, is about 100 km and a cargo of about 750 kg is loaded on the vehicle while the vehicle is running, the mass of the vehicle increases by about 750 kg due to the loaded cargo, and thus, the mass level of the vehicle may be changed to the "Level 3" from the "Level 0" (Level 0→Level 3).

Accordingly, the controller 110 may determine the update of the information on the distance to empty as the mass level of the vehicle is changed to the "Level 3" from the "Level 0" (Level 0→Level 3). When the update of the information on the distance to empty is determined, the controller 110 may request the energy consumption calculator 160 to calculate the driving energy consumption.

The energy consumption calculator 160 may extract the past-learned energy consumption corresponding to the mass level of the vehicle among past-learned energy consumptions for respective mass levels stored in the storage 140. The operation of extracting the past-learned energy consumption corresponding to the mass level of the vehicle will be described later with reference to FIG. 2.

Figure 2:
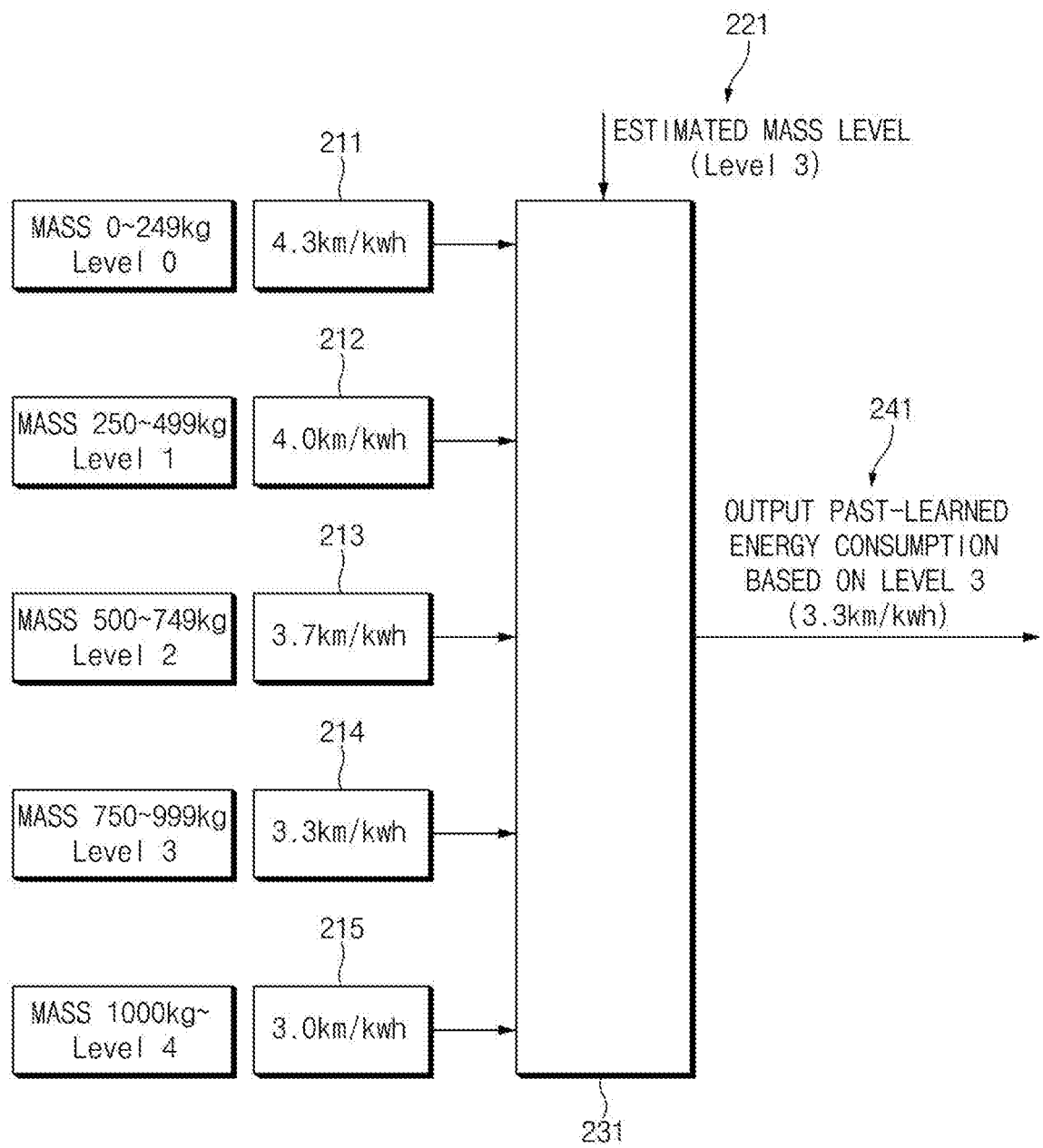
FIGS. 2, 3A, 3B, 4A, and 4B are views illustrating exemplary embodiments for explaining an operation of an apparatus for displaying a distance to empty of a vehicle according to an exemplary embodiment of the present disclosure.

Referring to FIG. 2, the past-learned energy consumptions are values obtained by learning previously-calculated energy consumptions for respective mass levels and stored in the storage 140. The past-learned energy consumption 211 of Level 0 corresponding to the mass range from about 0 kg to about 249 kg may be about 4.3 km/kwh, the past-learned energy consumption 212 of Level 1 corresponding to the mass range from about 250 kg to about 499 kg may be about 4.0 km/kwh, the past-learned energy consumption 213 of Level 2 corresponding to the mass range from about 500 kg to about 749 kg may be about 3.7 km/kwh, the past-learned energy consumption 214 of Level 3 corresponding to the mass range from about 750 kg to about 999 kg may be about 3.3 km/kwh, and the past-learned energy consumption 215 of Level 4 corresponding to the mass range equal to or greater than about 1000 kg may be about 3.0 km/kwh.

In this case, the energy consumption calculator 160 may call the past-learned energy consumptions 211 to 215 for respective mass levels and may extract and output the past-learned energy consumption among the past-learned energy consumptions 211 to 215 based on the mass level information estimated by the mass estimator 150, for example, when the Level 3 is input 221, the past-learned energy consumption 214 of about 3.3 km/kwh is extracted and output 241. The output past-learned energy consumption 214 may be used to calculate the energy consumption later.

The energy consumption calculator 160 may calculate the driving energy consumption based on the extracted past-learned energy consumption and a current energy consumption of the vehicle. In this case, the energy consumption calculator 160 may determine an application rate of the past-learned energy consumption and the current energy consumption and may calculate the energy consumption according to the determined rate.

Detailed descriptions on an operation of calculating the driving energy consumption will be described with reference to FIGS. 3A and 3B.

Figure 3A:
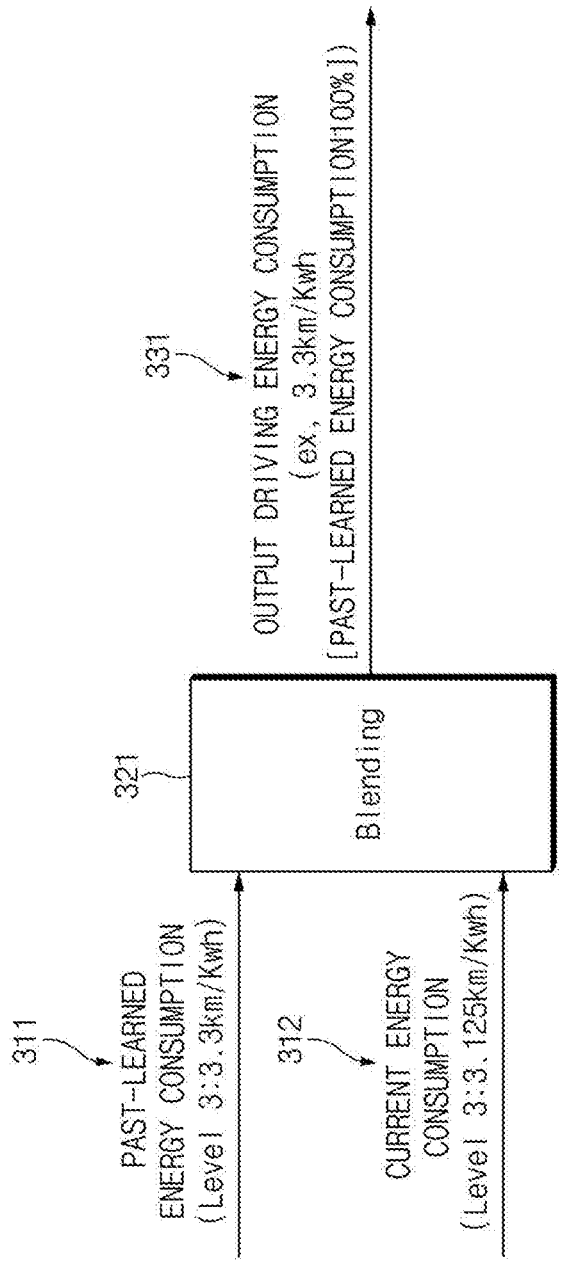
Figure 3B:
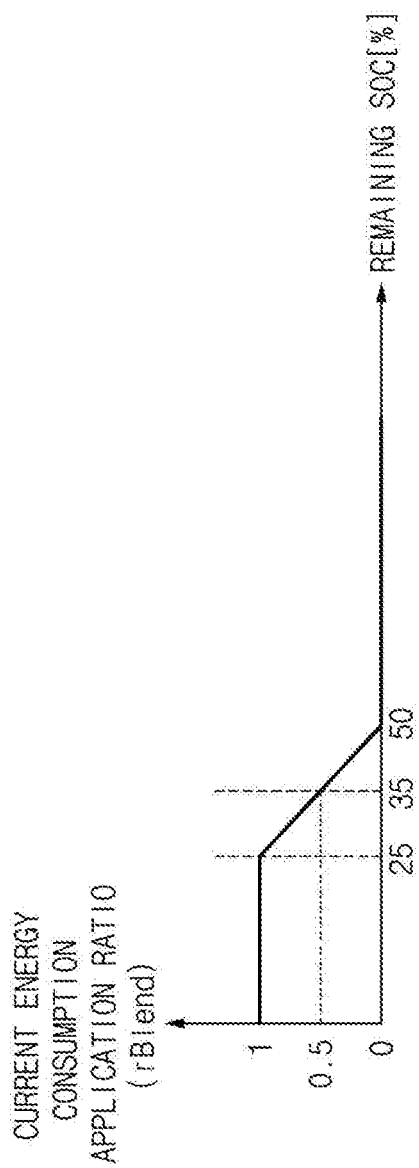

Referring to FIGS. 3A and 3B, the energy consumption calculator 160 may blend (321) the past-learned energy consumption 311 obtained by the embodiment of FIG. 2 and the current energy consumption 312 at a predetermined ratio to calculate the driving energy consumption.

In the present embodiment, the current energy consumption 312 may be calculated by dividing a cumulative travel distance after the battery is charged by an accumulated consumption of energy of the battery. As an example, when assuming that the cumulative travel distance after the battery is charged is about 100 km and the accumulated consumption of energy of the battery is about 32 kwh, the current energy consumption is about 100 km/32 kwh=3.125 km/kwh.

In this case, the energy consumption calculator 160 may calculate the driving energy consumption by applying the past-learned energy consumption 311 and the current energy consumption 312 to the following Equation 2.

Driving energy consumption={(1−rBlend)×past-learned energy consumption}+{rBlend×current energy consumption}    Equation 2

In Equation 2, "rBlend" denotes the current energy consumption application coefficient. The current energy consumption application coefficient determines application rate of the current energy consumption in the driving energy consumption.

Here, the current energy consumption application coefficient may be determined based on a remaining SOC as shown in FIG. 3B.

Referring to FIG. 3B, the current energy consumption application coefficient is 1 and rate of the current energy consumption become 100% when the remaining SOC is smaller than about 25%. Meanwhile, the current energy consumption application coefficient is 0 and rate of the current energy consumption become 0% when the remaining SOC is equal to or greater than about 50%. The current energy consumption application coefficient may be adjusted when the remaining SOC is in a range equal to or greater than about 25% and smaller than about 50%. In this case, the current energy consumption application rate may be adjusted to be inversely proportional to the remaining SOC by adjusting the rate of the current energy consumption application. As an example, in a case that the remaining SOC is about 35%, the current energy consumption application coefficient (rBlend) may be about 0.5.

When assuming that the remaining SOC is about 70%, the current energy consumption application coefficient is 0 (the past-learned energy consumption application rate is about 100%), the past-learned energy consumption is about 3.3 km/kwh, and the current energy consumption is about 3.125 km/kwh, the energy consumption calculator 160 may calculate the driving energy consumption using Equation 2 as follows: {(1−0)×3.3}+{0×3.125}=3.3[km/kwh].

In addition, the energy consumption calculator 160 may calculate an additional-use energy consumption in addition to the driving energy consumption. As an example, the energy consumption calculator 160 may calculate a FATC-use energy consumption when an air conditioning system is set to ON.

In this case, the energy consumption calculator 160 may calculate the FATC-use energy consumption by using a total travel distance after the battery is charged and a cumulative air conditioning-use power after the battery is charged. The cumulative air conditioning-use power after the battery is charged means a sum of a cumulated power usage for cooling and a cumulated power usage for heating after the battery is charged.

As an example, the energy consumption calculator 160 may calculate the FATC-use energy consumption by using the following Equation 3.

$$FATC\text{-use energy consumption} = \frac{\text{travel distance}}{\left(\begin{array}{c}\text{cumulative cooling} \\ \text{-use power}\end{array} + \begin{array}{c}\text{cumulative heating} \\ \text{-use power}\end{array}\right)}$$

Equation 3

As an example, when assuming that the travel distance after the battery is charged is about 100 km and the cumulative air conditioning-use power is about 1000 kwh, the energy consumption calculator 160 may calculate the FATC-use energy consumption using Equation 3 as follows: 100 km/1000 kwh=0.1 [km/kwh].

In addition, the energy consumption calculator 160 may calculate a charge/discharge energy consumption based on the road gradient as the additional-use energy consumption. In this case, the energy consumption calculator 160 may calculate the charge/discharge energy consumption from a charge/discharge energy consumption gain due to the road gradient on a traveling route.

The energy consumption calculator 160 may calculate the additional-use energy consumption from a value obtained by summing the calculated FATC-use energy consumption and the charge/discharge energy consumption. The energy consumption calculator 160 may transmit information on the previously-calculated driving energy consumption and the additional-use energy consumption to the controller 110 and/or the distance calculator 170.

Therefore, the distance calculator 170 may calculate the distance to empty of the vehicle using the driving energy consumption and the additional-use energy consumption, which are calculated by the energy consumption calculator 160. In this case, the distance calculator 170 may calculate the distance to empty of the vehicle by using the following Equation 4.

Distance to empty=(battery's available energy×driving energy consumption)−(battery's available energy×other use energy consumption)   Equation 4

In the present embodiment, information on the battery's available energy may be obtained from a battery management system (BMS).

As an example, when assuming that the battery's available energy is about 60 kwh and the air conditioning system is set to ON, the distance to empty when the mass level is Level 0 may be calculated as follows: (60 kwh×4.3 km/kwh)−(60 kwh×0.1 km/kwh)=258 km−6 km=252 [km].

Under the same condition, the distance to empty when the mass level is Level 3 may be calculated as follows: (60 kwh×3.3 km/kwh)−(60 kwh×0.1 km/kwh)=198 km−6 km=192 [km].

Accordingly, the controller 110 may update the distance to empty based on Level 0 displayed on the display to the distance to empty based on Level 3.

When information on the distance to empty displayed on the display is updated, the controller 110 may update the display information after informing that the display information is to be changed for a predetermined time (Rate Limit) instead of suddenly updating the display information. This will be described with reference to FIGS. 4A and 4B.

Figure 4A:
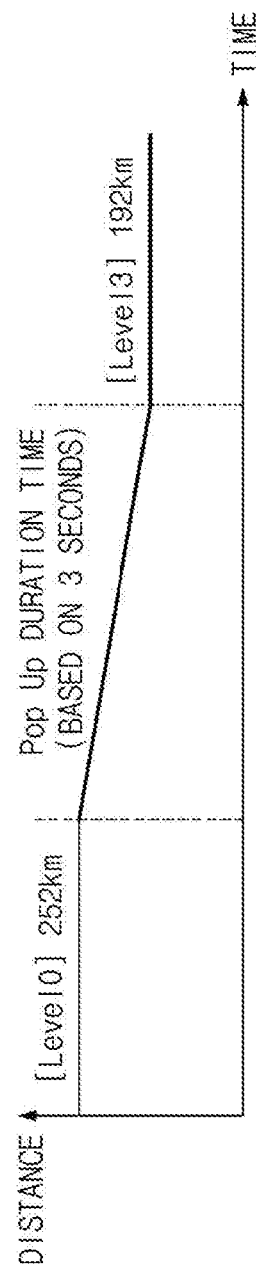
Figure 4B:
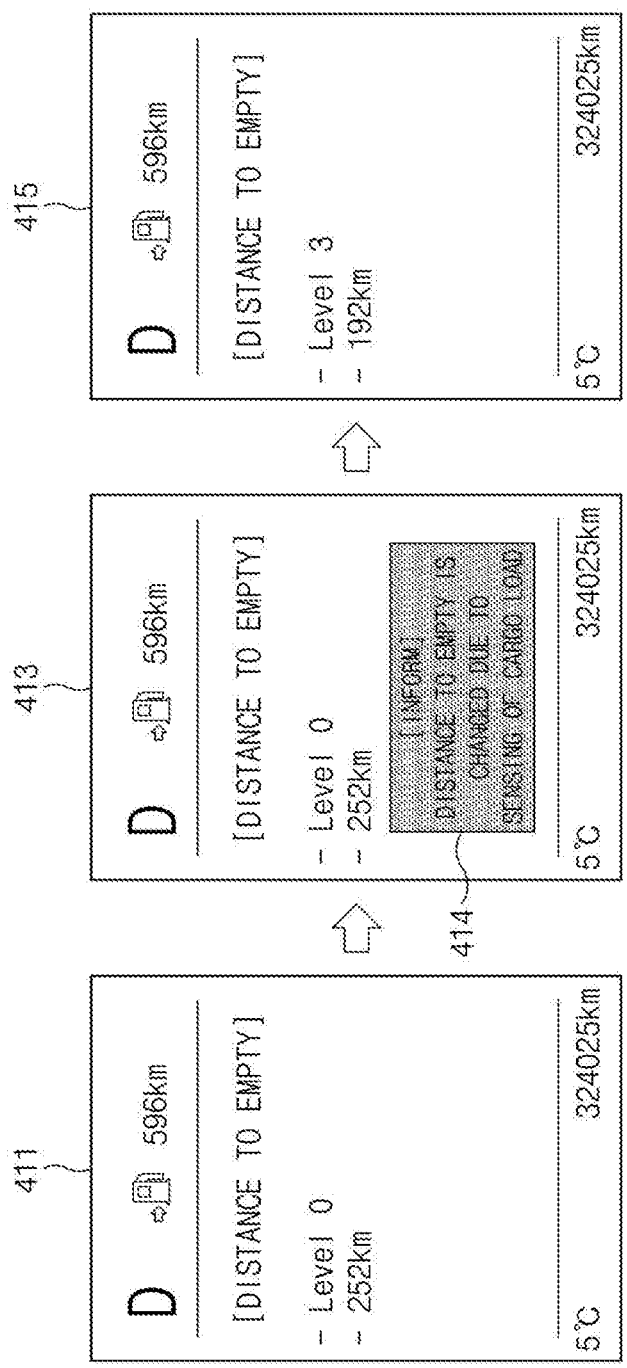

Referring to FIGS. 4A and 4B, the controller 110 displays the distance to empty of about 252 km corresponding to the mass level of Level 0 based on an initial mass at a driving-start point of the vehicle on the display. In this case, a display screen on which the distance to empty corresponding to the mass level of Level 0 is displayed may be represented by a reference numeral 411 in FIG. 4B.

Then, when the update of the distance to empty is determined due to the change of the mass level after the cargo is loaded on the vehicle, the controller 110 displays a popup for a predetermined rate limit, e.g., for about three minutes, to inform that the distance to empty is to be changed. In this case, the display screen may be represented by a reference numeral 413 in FIG. 4B, and the popup may be displayed as a reference numeral 414 shown in FIG. 4B.

The controller 110 updates the display screen to display the distance to empty corresponding to the changed mass level of Level 3 after displaying the popup for the predetermined rate limit. In this case, the updated display screen may be represented by a reference numeral 415 in FIG. 4B.

The apparatus 100 for displaying the distance to empty of the vehicle, which operates as described above, may be implemented in one independent hardware including a memory and a processer processing each operation and may be driven while being included in other hardware, e.g., a microprocessor or a general-purpose computer system.

Hereinafter, an operation of the apparatus 100 for displaying the distance to empty of the vehicle, which has the above-mentioned configurations, according to the present disclosure will be described in detail.

Figure 5:
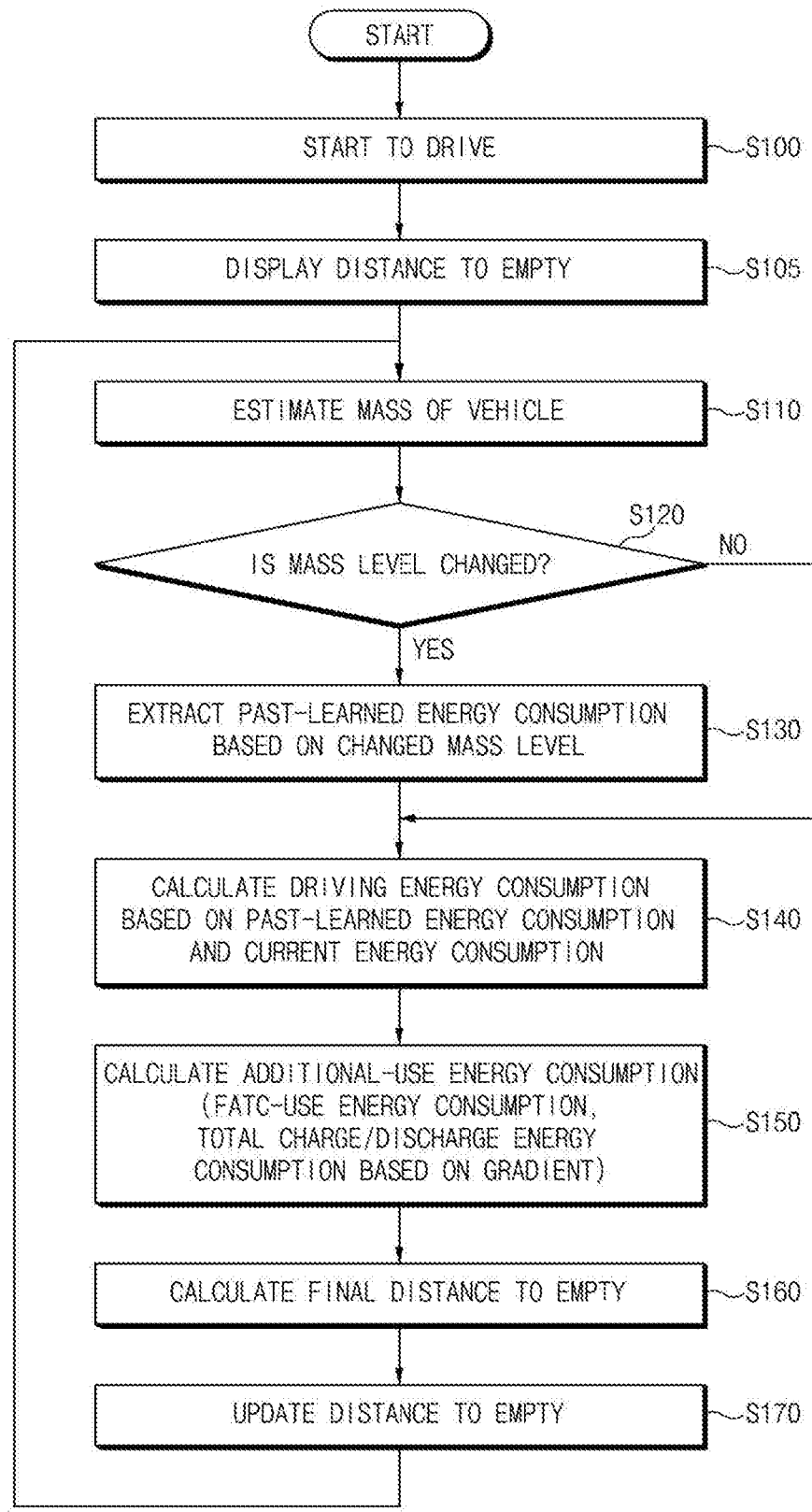
FIG. 5 is a flowchart illustrating an operation of an apparatus for displaying a distance to empty of a vehicle according to an exemplary embodiment of the present disclosure.

FIG. 5 is a flowchart illustrating an operation of a method for displaying the distance to empty of the vehicle according to an exemplary embodiment of the present disclosure.

Referring to FIG. 5, the apparatus 100 for displaying the distance to empty of the vehicle displays the distance to empty calculated by using the battery's available energy, the driving energy consumption, and the additional-use energy consumption after the vehicle starts to run (S100 and S105).

Then, the apparatus 100 for displaying the distance to empty of the vehicle estimates the mass of the vehicle while the vehicle is running (S110). When the cargo is loaded on or unloaded from the vehicle while the vehicle is running, the mass of the vehicle increases or decreases. Accordingly, the apparatus 100 for displaying the distance to empty of the vehicle identifies the mass level depending on the degree of increase/decrease in the mass estimated in operation S110 with respect to the initial mass and extracts the past-learned energy consumption based on the changed mass level among the past-learned energy consumptions for respective mass levels (S130) when the mass level is changed (S120).

The apparatus 100 for displaying the distance to empty of the vehicle may use the past-learned energy consumption based on an existing mass level when it is identified that the mass level is not changed in operation S120.

The apparatus 100 for displaying the distance to empty of the vehicle calculates the driving energy consumption using the past-learned energy consumption based on the mass level and the current energy consumption (S140). Detailed descriptions on the operation of calculating the driving energy consumption are the same as those of the embodiment described with reference to FIGS. 3A and 3B.

In addition, the apparatus 100 for displaying the distance to empty of the vehicle may further calculate the additional-use energy consumption due to additionally-operated systems (S150). For example, the apparatus 100 for displaying the distance to empty of the vehicle may calculate the FATC-use energy consumption and the charge/discharge energy consumption based on the gradient and may calculate the additional-use energy consumption from the total sum of the calculated energy consumptions.

The apparatus 100 for displaying the distance to empty of the vehicle calculates a final distance to empty using the driving energy consumption calculated in operation S140 and the additional-use energy consumption calculated in operation S150 (S160) and updates the information on the distance to empty displayed on the display based on the distance to empty calculated in operation S160 (S170). Detailed descriptions on the operation of updating the information on the distance to empty are the same as those of the embodiment described with reference to FIGS. 4A and 4B.

Figure 6:
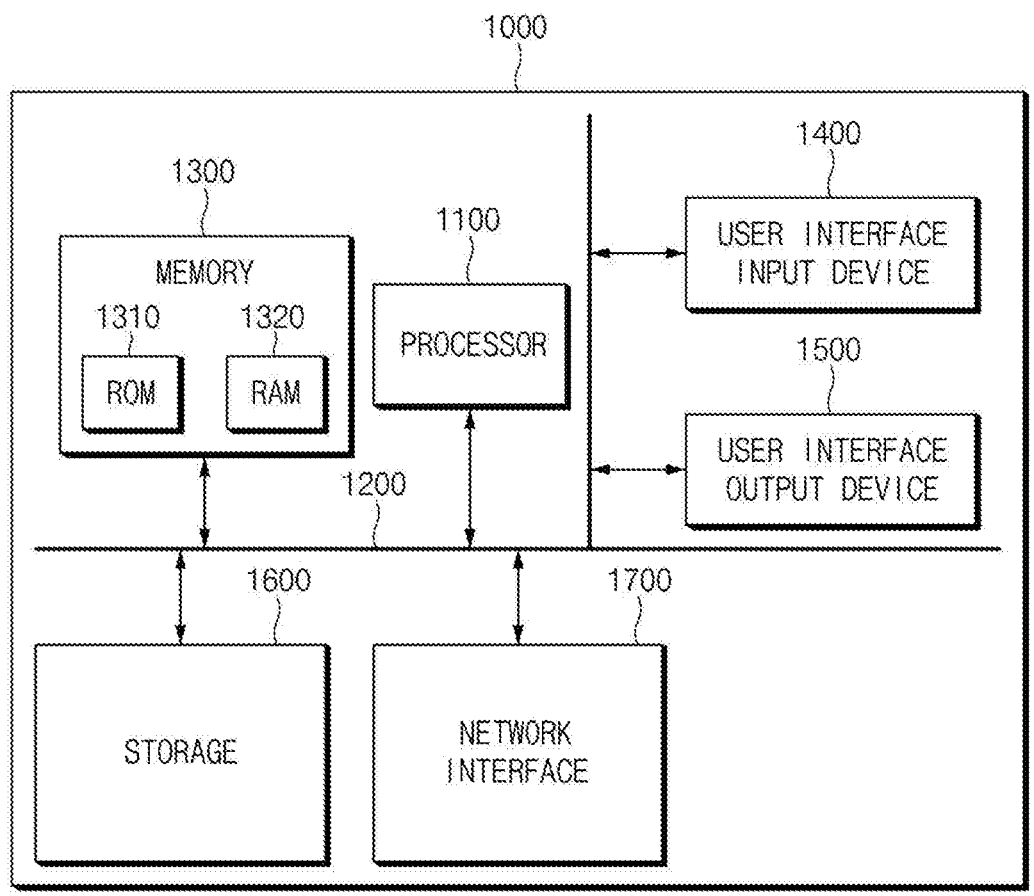
FIG. 6 is a block diagram illustrating a configuration of a computing system that executes a method according to an exemplary embodiment of the present disclosure.

FIG. 6 is a block diagram illustrating a configuration of a computing system that executes the method according to an exemplary embodiment of the present disclosure.

Referring to FIG. 6, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as a separate component in the user terminal.

According to the above, the apparatus and method may accurately provide information on the distance to empty and improve reliability and convenience of the driver at the same time by estimating the increase or decrease in mass due to loading or unloading of the cargo while the vehicle is running and predicting the distance to empty in consideration of the energy consumption depending on the increase or decrease in mass.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. An apparatus for displaying a distance to empty of a vehicle, comprising a controller configured to:
   estimate a state of a mass of the vehicle, which increases or decreases while the vehicle is running;
   calculate a driving energy consumption using a past-learned energy consumption based on a mass level corresponding to the increased or decreased mass of the vehicle while the vehicle is running, and a current energy consumption of the vehicle;
   calculate the distance to empty of the vehicle based on the driving energy consumption;
   determine whether to update the distance to empty displayed on a display based on the mass level;
   update display information on the display based on the distance to empty;
   extract the past-learned energy consumption corresponding to the mass level of the vehicle among past-learned energy consumptions for previously-learned respective mass levels;

calculate the driving energy consumption of the vehicle by applying the extracted past-learned energy consumption and the current energy consumption of the vehicle at a predetermined rate;

determine an application rate of the current energy consumption in the driving energy consumption to about 100% when a remaining SOC is smaller than a first reference value;

determine the application rate of the current energy consumption in the driving energy consumption to about 0% when the remaining SOC is equal to or greater than a second reference value; and adjust the application rate of the current energy consumption in the driving energy consumption to be inversely proportional to the remaining SOC when the remaining SOC is equal to or greater than the first reference value and smaller than the second reference value.

2. The apparatus of claim 1, wherein the controller is configured to update the distance to empty displayed on the display when the mass level is different from an initial mass level of the vehicle.

3. The apparatus of claim 1, wherein the controller is configured to estimate the state of the mass of the vehicle based on at least one of a reducer efficiency, a motor torque, a running load, a vehicle speed, or a road gradient of the running vehicle.

4. The apparatus of claim 1, wherein the controller is further configured to calculate an additional-use energy consumption based on a travel distance of the vehicle and an air conditioner-use power of the vehicle when an air conditioning system in the vehicle operates in an ON state.

5. The apparatus of claim 4, wherein the controller is configured to:

calculate a charge/discharge energy consumption gain depending on a gradient of a road ahead; and add the charge/discharge energy consumption gain to the additional-use energy consumption.

6. The apparatus of claim 4, wherein the controller is configured to calculate the distance to empty of the vehicle based on the driving energy consumption and the additional-use energy consumption of the vehicle.

7. The apparatus of claim 1, wherein the controller is further configured to inform a state of change in the distance to empty due to the increased or decreased mass on the display during a predetermined time before updating the display information on the display when the distance to empty displayed on the display is determined to be updated.

8. A method for displaying a distance to empty of a vehicle, comprising steps of:

estimating a state of a mass of the vehicle, which increases or decreases while the vehicle is running;

determining whether to update the distance to empty displayed on a display based on a mass level corresponding to the increased or decreased mass of the vehicle while the vehicle is running;

calculating a driving energy consumption using a past-learned energy consumption based on the mass level while the vehicle is running, and a current energy consumption of the vehicle;

calculating the distance to empty of the vehicle based on the driving energy consumption;

updating display information on the display based on the distance to empty;

extracting the past-learned energy consumption corresponding to the mass level of the vehicle among past-learned energy consumptions for previously-learned respective mass levels;

calculating the driving energy consumption of the vehicle by applying the extracted past-learned energy consumption and the current energy consumption of the vehicle at a predetermined rate;

determining an application rate of the current energy consumption in the driving energy consumption to about 100% when a remaining SOC is smaller than a first reference value;

determining the application rate of the current energy consumption in the driving energy consumption to about 0% when the remaining SOC is equal to or greater than a second reference value; and adjusting the application rate of the current energy consumption in the driving energy consumption to be inversely proportional to the remaining SOC when the remaining SOC is equal to or greater than the first reference value and smaller than the second reference value.

9. The method of claim 8, wherein the step of determining whether to update the distance to empty comprises updating the distance to empty displayed on the display when the mass level is different from an initial mass level of the vehicle.

10. The method of claim 8, wherein the step of estimating a state of a mass of the vehicle comprises estimating the state of the mass of the vehicle based on at least one of a reducer efficiency, a motor torque, a running load, a vehicle speed, or a road gradient of the vehicle running.

11. The method of claim 8, further comprising a step of calculating an additional-use energy consumption based on a travel distance of the vehicle and an air conditioner-use power of the vehicle when an air conditioning system in the vehicle operates in an ON state.

12. The method of claim 11, wherein the step of calculating an additional-use energy consumption comprises:

calculating a charge/discharge energy consumption gain depending on a gradient of a road ahead; and adding the charge/discharge energy consumption gain to the additional-use energy consumption.

13. The method of claim 11, wherein the step of calculating the distance to empty of the vehicle comprises calculating the distance to empty of the vehicle based on the driving energy consumption and the additional-use energy consumption of the vehicle.

14. The method of claim 8, further comprising a step of informing a state of change in the distance to empty due to the increase or decrease of the mass on the display during a predetermined time before the display information on the display is updated when the distance to empty displayed on the display is determined to be updated.

* * * * *